Sept. 19, 1961 C. S. TERRY, JR 3,000,049
PLASTIC HINGE AND METHOD OF MAKING THE SAME
Filed Aug. 4, 1958
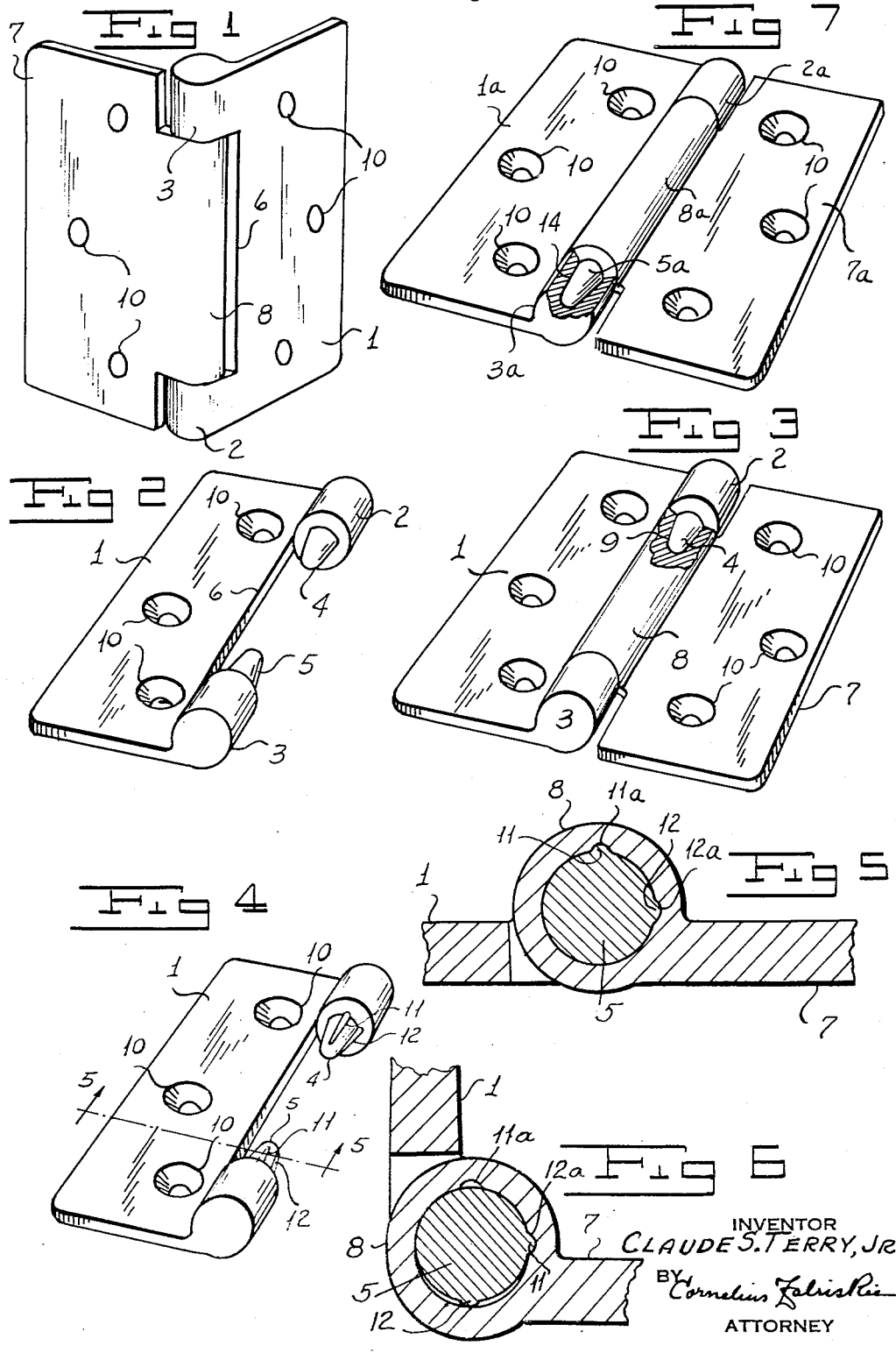
INVENTOR
CLAUDE S. TERRY, JR.
BY
ATTORNEY

United States Patent Office 3,000,049
Patented Sept. 19, 1961

3,000,049
PLASTIC HINGE AND METHOD OF MAKING THE SAME
Claude S. Terry, Jr., Bainbridge, N.Y., assignor to American Plastics Corporation, New York, N.Y., a corporation of New York
Filed Aug. 4, 1958, Ser. No. 752,690
10 Claims. (Cl. 16—139)

This invention is a plastic hinge made by the so-called "two-shot" method of injection molding thermoplastics.

Plastic hinges have heretofore been molded by the two-shot method, according to which it has been the practice to first mold one leaf of the hinge with a plurality of spaced apart knuckles having cored straight-through cylindrical holes for the pintle. The companion leaf, also with a plurality of knuckles, was thereafter molded, in a positioning die, in such manner that its pintle was formed with the latter leaf and in place within the pintle holes of the first leaf. United States Patent No. 2,569,862, granted October 2, 1951, to L. H. Morin is an example of this procedure.

The foregoing practice has many disadvantages. In order to form the straight-through pintle holes in the first molded leaf, relatively long lateral core pins must be used during the first "shot." These core pins and their operating mechanisms complicate the molding apparatus, particularly where multiple mold cavities are employed and they are altogether undesirable from both the cost and operating standpoints. Moreover, and of greater import, is the fact that the second molded leaf shrinks as it cools. This causes binding between the parts and a tendency to stress and warp either or both the leaves out of true, with possible breakage or failure of the end product hinge to properly function.

The primary object of this invention is to provide a method of making an injection molded plastic hinge in conventional dies, without setting up inherent stresses in the end product hinge, and without the use of side core pins.

A further object is to provide a two-shot injection molded hinge which will be free of inherent stresses and which will embody an imperceptible clearance, devoid of loss motion or looseness between its articulating parts.

Another object is the production of such a hinge of maximum strength with a minimum amount of plastic in its structure.

Features of the invention, other than those adverted to, will be apparent from the hereinafter detailed description and appended claims when read in conjunction with the accompanying drawing.

The accompanying drawing illustrates different practical embodiments of the invention, but the constructions therein shown are to be understood as illustrative, only, and not as defining the limits of the invention.

In said drawings:

FIG. 1 is a perspective view of a hinge embodying the present invention, as viewed from the back thereof.

FIG. 2 is a perspective view of the right hand leaf shown in FIG. 1. In FIG. 2 said right hand leaf is shown alone in order to more clearly exhibit its structure.

FIG. 3 is a front perspective view showing the entire hinge of FIGS. 1 and 2 with a portion of one of the knuckles broken away in the interest of clearness.

FIG. 4 is a view like FIG. 2, but illustrating a modified form of the invention.

FIG. 5 is a section in the plane of the line 5—5 of FIG. 4 showing the leaves of the hinge in parallel relation.

FIG. 6 is a view corresponding to FIG. 5, but showing the leaves of the hinge at right angles to one another.

FIG. 7 is a view corresponding to FIG. 3, but illustrating a further modified form of the invention.

It is characteristic of all prior molded plastic hinges, that they invariably comprise a pintle integral with a plurality of knuckles, including the terminal knuckles of one leaf of the hinge and extending for the full height of the hinge through the knuckles of the other leaf. The hinge of this invention radically departs from this structure. Instead of a full length pintle, it embodies a plurality of stub pintles, each of which is of a length materially less than the height of the hinge and with each stub pintle integral with but a single knuckle.

In the preferred form of the invention shown in FIGS. 1, 2 and 3 of the drawing, a so-called "butt" style of hinge is shown although it will be understood that the hinge may be of the "strap" or any other style depending upon the shape of the leaves thereof. As shown, the female leaf 1 has two coaxial spaced apart knuckles 2 and 3 provided on their adjacent ends with stub pintles 4 and 5, respectively. These are coaxial with one another and with the knuckles 2 and 3 and extend toward one another into the intervening space 6, as best seen in FIG. 2. The stub pintles 4 and 5 are shown as tapered from a relatively broad base, where they join the knuckles, to a somewhat rounded smaller end. They may thus be defined as substantially frusto conical in form. This is the ideal shape. It insures maximum strength in the union with the knuckles to withstand shearing and breaking strains to which the hinge may be subjected during its normal use. Furthermore, the taper of these pintles performs an important function in the carrying out of the method of this invention as will hereinafter be explained.

In making the hinge of FIGS. 1, 2 and 3, the female leaf 1, with its integral knuckles and stub pintles, is produced by injection molding thermoplastic material in any appropriate die of conventional form to produce the structure shown in FIG. 2. Thereafter, this completed female leaf is placed in proper cooperative relation with a die cavity appropriate to cast the companion male leaf 7 shown in FIG. 3 according to known procedure of "two-shot" injection molding.

This second "shot" injects hot thermoplastic material into said die cavity to fill the same. In so doing the plastic forms the leaf 7 with the single integral knuckle 8 interposed between the knuckles 2 and 3 of the female leaf 1 and with the opposite end portions of the single knuckle 8 embracing the stub pintles 4 and 5 of the latter leaf. As the hot plastic fills the said die cavity, it comes into direct contact with said stub pintles and the adjacent faces of the knuckles 2 and 3 of the other leaf.

If this condition persisted as this plastic cooled, plastics, such as nylon, would cause such tight gripping between the parts that they would, in effect, be "frozen" together and any attempt to subsequently articulate the hinge would result in the breakage thereof. However, I have discovered, and tests have shown, that when the stub pintles 4 and 5 are tapered toward their free ends, the shrinkage which occurs during the cooling of the male leaf 7 will bring about sufficient contraction of all parts of the leaf 7, including the knuckle 8, to cause enough decrease in the length of that knuckle to very slightly withdraw the blind end sockets 9 in said knuckle from their tight engagement with the pintles 4 and 5. This is due to the fact that both the pintles and their cooperating sockets are tapered in a direction longitudinally of the knuckle and the slightest amount of such withdrawal will produce the necessary freedom of articulation between said knuckle and the pintles without producing such excessive clearance as will result in appreciable loss motion or looseness between them.

Thus, the preferred form of the method of this invention is carried out through a "two-shot" molding operating, in the first shot of which the femal leaf is cast with spaced apart knuckles having coaxial integral tapered stub pintles projecting toward one another, followed by the second shot molding which consists in hot casting about these tapered pintles the male leaf with a single knuckle, the opposite ends of which embrace and contain said tapered pintles, whereby the cooling of the plastic of the second shot effects sufficient shrinkage and consequent clearance to eliminate binding between the pintles of the female leaf and the knuckle of the male leaf.

In the molding of both leaves appropriate screw holes 10 may be provided by incorporating projections in the die cavities for this purpose as will be well understood by those skilled in the art and, if desired, the die cavities for the molding of either one or both of the leaves may be shaped to produce embossed patterns on one or both of said leaves.

In the hinge hereinbefore described and shown in FIGS. 1-3 of the drawing, the leaves are freely pivotal with respect to one another. However, if desired there may be incorporated in this construction one or more detents whereby the leaves may be locked in fully opened or fully closed positions or in any predetermined intermediate position desired. This may be accomplished by molding the female leaf 1, in the first shot of the molding operation, with one or more beads on either or both of the stub pintles 4 and 5, as shown in FIG. 4. In this showing two beads 11 and 12 are formed on each pintle and they extend longitudinally of such pintle. However, instead of forming one or more beads as stated, one or more dimples may be employed. In any event the second shot of the molding operation, to cast the companion male leaf 7 in cooperative relation to the female leaf 1 shown in FIG. 4, will form sockets within the knuckles of the male leaf and these sockets will contain depressions 11a and 12a, complementary to the corresponding beads 11 and 12 of the pintles. The effect of this procedure and structure is shown in FIGS. 5 and 6 which are enlarged fragmental sections taken on the line 5—5 of FIG. 4 and showing the leaves in different relative pivotal positions.

The leaves are injection molded in the flat condition shown in FIG. 5. This figure clearly shows the resulting cast in section through the beads 11 and 12 and illustrates how these beads form in the knuckle 8 the depressions 11a and 12a. If, from the relation of the parts shown in FIG. 5, the female leaf 1 is pivotally moved to the position of FIG. 6, the bead 11 will ride out of the depression 11a and enter the depression 12a, while the bead 12 will ride out of the depression 12a and partake of the position shown in FIG. 6, wherein it is not opposed by any depression. It is important in making a hinge with detents as described, to keep these detents sufficiently small, so that the bulging or deformation of the wall of the socket in the male knuckle 8 will not exceed the elastic limits of the plastic of that knuckle for it will be apparent that the movement of the beads from one position to the other must necessarily bring about sufficient deformation of the embracing part of such knuckle to permit of its travel. In the manner described the detent elements are sprung into and out of relation with one another as the leaves of the hinge are relatively pivotally moved. In the showing of FIGS. 4, 5 and 6 the two positions of locking are at 90 degrees to one another, although in practice the beads or dimples may be in any predetermined position desired and one or more of such detents may be used without departing from this invention.

In the hinges illustrated in FIGS. 2-6 inclusive, the pintles are formed on the female leaf of the hinge and are of substantially frusto conical form so as to obtain the advantages hereinbefore described. This formation is preferred and is in fact practically necessary when molding relatively hard plastics, such as nylon. However, the use of the stub pintles has advantages over and above the tapering thereof and in the molding of some of the softer plastics, such, for example, as polyethylene, it is sometimes possible to use the stub pintles of cylindrical or substantially cylindrical form. Some breakage may result in a hinge thus made, but the saving in costs over the more expensive plastics may justify such a construction for a cheap hinge.

If one desires to make a plastic hinge of the general character herein described and does not object to the use of laterally operable core pins, many of the advantages of this invention may be obtained by making such a hinge as shown in FIG. 7. In the manufacture of that hinge the female leaf 1a with knuckles 2a and 3a is cast in the first shot, using a die with laterally movable cores to form within the adjacent faces of the knuckles 2a and 3a, sockets 14 as shown. Thereafter, and in the second shot, the male leaf 7a is molded with a knuckle 8a provided at its opposite ends with stub pintles, such as 5a, molded in the corresponding socket 14. As shown in FIG. 7 each socket 14 and pintle 5a is tapered for the reasons and purposes hereinbefore described and, as the male member of the hinge is last cast, shrinkage will produce the desired freedom of articulatory movement between the hinge parts.

It is apparent from the drawing that in each of the forms of the invention shown therein, the pintles are so long that the leaves of the hinges cannot be assembled or separated from one another by snap-action between them. As this invention is illustrated it would manifestly be impossible to mold the leaves separately and apart from one another and thereafter enter the pintles into the sockets of knuckles by snap-action or in any other way. The only way to make the hinge of this invention is by the two step molding procedure hereinafter described.

The foregoing detailed description sets forth the invention in its preferred practical forms, but the invention is to be understood as fully commensurate with the appended claims.

Having thus fully described the invention, what I claim as new and desire to secure by Letters Patent is:

1. A two shot injection molded thermoplastic hinge comprising: two leaves one of which has two spaced apart knuckles each with an integral stub pintle projecting toward and coaxial with the stub pintle of the other knuckle, and the other leaf of which has a single kunckle interposed between the aforesaid knuckles of the first leaf and provided at its opposite ends with sockets conforming in shape to and containing said stub pintles, each pintle being so long that the leaves of the hinge cannot be assembled or separated from one another by snap-action between them.

2. A two-shot injecton molded thermoplastic hinge comprising: two leaves one of which has two spaced apart knuckles each with a substantially frusto conical stub pintle projecting toward and coaxial with the stub pintle of the other knuckle, and the other leaf of which has a single knuckle interposed between the knuckles of the first leaf and provided at its opposite ends with substantally frusto conical sockets conforming in shape to and containing said stub pintles, each pintle being so long that the leaves of the hinge cannot be assembled or separated from one another by snap-action between them.

3. A two-shot injection molded thermoplastic hinge comprising: two leaves one of which has a single knuckle, the opposite ends of which are provided with integral stub pintles projecting in opposite directions and coaxial with one another and the other leaf of which has two knuckles straddling the single knuckle of the first leaf and provided with sockets conforming in shape to and containing said stub pintles, each pintle being so long that the leaves of the hinge cannot be assembled or separated from one another by snap-action between them.

4. A two-shot injection molded thermoplastic hinge comprising: two leaves one of which has a single knuckle provided at each end with an integral substantially frusto conical stub pintle coaxial with the other stub pintle of said leaf and projecting in an opposite direction therefrom and the other leaf of which has two knuckles straddling the single knuckle of the first leaf and each of which knuckles of the second leaf is provided with a substantially frusto conical socket conforming in shape to and containing one of said stub pintles, each pintle being so long that the leaves of the hinge cannot be assembled or separated from one another by snap-action between them.

5. A two-shot injection molded thermoplastic hinge comprising: two leaves one of which has two spaced apart knuckles each with a substantially frusto conical stub pintle projecting toward and coaxial with the stub pintle of the other knuckle, and the other leaf of which has a single knuckle interposed between the knuckles of the first leaf and provided at its opposite ends with substantially frusto conical sockets conforming in shape to and containing said stub pintles, at least one of said pintles and the corresponding socket including a detent comprising at least one projection on the surface of one of them and at least one complementary depression in the surface of the other, each pintle being so long that the leaves of the hinge cannot be assembled or separated from one another by snap-action between them.

6. A two-shot injection molded thermoplastic hinge comprising: two leaves one of which has a single knuckle provided at each end with an integral substantially frusto conical stub pintle coaxial with the other stub pintle of said leaf and projecting in an opposite direction therefrom and the other leaf of which has two knuckles straddling the single knuckle of the first leaf and each of which knuckles of the second leaf is provided with a substantially frusto conical socket conforming in shape to and containing one of said stub pintles, at least one of said pintles and the corresponding socket including a detent comprising at least one projection on the surface of one of them and at least one complementary depression in the surface of the other, each pintle being so long that the leaves of the hinge cannot be assembled or separated from one another by snap-action between them.

7. A two-shot injection molded plastic hinge comprising: two leaves, one of which has two spaced apart knuckles and the other of which has a single interposed knuckle, and a stub pintle connecting the contiguous ends of each two adjacent knuckles and being integral with one of said adjacent knuckles and projecting into a conformably shaped socket in the other adjacent knuckle, each pintle being so long that the leaves of the hinge cannot be assembled or separated from one another by snap-action between them.

8. A hinge according to claim 7, wherein each pintle and the corresponding socket are substantially frusto conical.

9. A hinge according to claim 7, wherein each pintle and the corresponding socket are provided with detent means embodying at least one projection on one of them and at least one complementary depression on the other.

10. A hinge according to claim 7, wherein each pintle and the corresponding socket are substantially frusto conical and are provided with detent means comprising at least one projection on one of them and at least one complementary depression on the other.

References Cited in the file of this patent
UNITED STATES PATENTS

| | | |
|---|---|---|
| 743,279 | Haycock | Nov. 3, 1903 |
| 1,969,057 | Woodin | Aug. 7, 1934 |
| 2,379,928 | Rosenheim | July 10, 1945 |
| 2,484,581 | Pallmen | Oct. 11, 1949 |
| 2,577,350 | Morin | Dec. 4, 1951 |
| 2,776,521 | Zimmerman | Jan. 8, 1957 |
| 2,826,780 | Dorfman | Mar. 8, 1958 |
| 2,829,402 | Morin | Apr. 8, 1958 |